(12) United States Patent
Kinoshita et al.

(10) Patent No.: US 7,838,150 B2
(45) Date of Patent: Nov. 23, 2010

(54) NONAQUEOUS LITHIUM SECONDARY BATTERY WITH CARBON ELECTRODES

(75) Inventors: Hajime Kinoshita, Osaka (JP); Shizukuni Yata, Osaka (JP)

(73) Assignee: KRI, Inc., Kyoto-shi (JP)

( * ) Notice: Subject to any disclaimer, the term of this patent is extended or adjusted under 35 U.S.C. 154(b) by 292 days.

(21) Appl. No.: 10/381,513

(22) PCT Filed: Nov. 7, 2001

(86) PCT No.: PCT/JP01/09710

§ 371 (c)(1),
(2), (4) Date: Mar. 24, 2003

(87) PCT Pub. No.: WO02/41420

PCT Pub. Date: May 23, 2002

(65) Prior Publication Data

US 2004/0023118 A1    Feb. 5, 2004

(30) Foreign Application Priority Data

Nov. 17, 2000    (JP) .............................. 2000-351280

(51) Int. Cl.
    H01M 4/583    (2010.01)
    H01M 4/133    (2010.01)
    H01M 10/054   (2010.01)
    H01M 10/056   (2010.01)

(52) U.S. Cl. ............................ 429/231.8; 429/231.95; 429/324

(58) Field of Classification Search ............... 429/137, 429/145, 236, 209, 231.8–231.95
    See application file for complete search history.

(56) References Cited

U.S. PATENT DOCUMENTS

| | | | | |
|---|---|---|---|---|
| 4,510,216 A * | 4/1985 | Nogami et al. | ............... | 429/101 |
| 4,628,015 A * | 12/1986 | Yata et al. | ................... | 429/336 |
| 5,789,114 A * | 8/1998 | Adachi et al. | ............... | 429/232 |
| 5,965,296 A * | 10/1999 | Nishimura et al. | ....... | 429/231.8 |
| 6,482,547 B1 * | 11/2002 | Yoon et al. | ............... | 429/231.8 |
| 6,528,212 B1 * | 3/2003 | Kusumoto et al. | .......... | 429/233 |
| 6,605,386 B1 * | 8/2003 | Kasamatsu et al. | ....... | 429/218.1 |
| 6,898,067 B1 * | 5/2005 | Hiratsuka et al. | ........... | 361/302 |
| 2003/0129494 A1 * | 7/2003 | Kaneda et al. | ........... | 429/231.1 |

FOREIGN PATENT DOCUMENTS

EP    0 973 180 A3    1/2000

(Continued)

OTHER PUBLICATIONS

Yasuda et al., eds., "Dictionary of Carbon Terminology, $1^{st}$ ed.," published by Agune Syofu Sha, Oct. 5, 2000.

Primary Examiner—Keith Walker
(74) Attorney, Agent, or Firm—Edwards Angell Palmer & Dodge LLP

(57) ABSTRACT

A nonaqueous lithium secondary battery comprising a positive electrode, a negative electrode, and a nonaqueous electrolyte, wherein: 1) the positive electrode comprises a porous carbonaceous material whose BET specific surface area is at least 500 $m^2/g$, or a mixture of a porous carbonaceous material whose BET specific surface area is at least 500 $m^2/g$ and a material capable of electrochemically occluding and releasing lithium; and 2) the negative electrode comprises a carbonaceous material whose BET specific surface area is 20 to 1000 $m^2/g$.

10 Claims, 1 Drawing Sheet

FOREIGN PATENT DOCUMENTS

| | | |
|---|---|---|
| JP | 61-218060 | 9/1986 |
| JP | 64-041162 | 2/1989 |
| JP | 6-020690 | 1/1994 |
| JP | 06-097004 | 4/1994 |
| JP | 11-026024 | 1/1999 |
| JP | 11026024 A * | 1/1999 |
| JP | 2000-138074 | 5/2000 |
| JP | 2000-251889 | 9/2000 |
| JP | 2001-229926 | 8/2001 |

* cited by examiner

NONAQUEOUS LITHIUM SECONDARY BATTERY WITH CARBON ELECTRODES

RELATED APPLICATIONS

This application is the U.S. National Phase under 35 U.S.C. §371 of International Application PCT/JP01/09710, filed Nov. 7, 2001, which claims priority to Japanese Patent Application No. 2000-351280, filed Nov. 17, 2000. The International Application was published under PCT Article 21(2) in a language other than English.

TECHNICAL FIELD

This invention relates to a nonaqueous lithium secondary battery that combines high energy density and high-power.

BACKGROUND ART

Nighttime power storage systems, decentralized household-use power storage systems based on solar power generation technology, power storage systems for electric vehicles, and so forth have attracted widespread attention in recent years because they help protect the global environment and conserve natural resources by utilizing energy more efficiently.

The most important requirement of these storage systems is that the energy density of the battery used should be high. In an effort to meet this requirement, organizations such as the Lithium Battery Energy Storage Technology Research Association (LIBES) have been actively developing lithium ion batteries as promising candidates for high-energy-density batteries.

The second most important requirement is that the power of these storage systems should be stable. For instance, when combining a high-efficiency engine and an energy storage system (such as in a hybrid electric vehicle), or a fuel cell and an energy storage system (such as in a fuel-cell electric vehicle), if the engine or fuel cell is to operate at maximum efficiency, it is essential that it operates at a constant power, and high-rate power discharge characteristics and/or high-rate charging characteristics are required in an energy storage system in order to accommodate power fluctuations in the load or energy regeneration.

Today, an electric double layer capacitor employing activated carbon in the electrode is commonly used as a high-power energy storage device, and large capacitors whose power densities exceed 2 kW/L have been developed. However, since the energy density thereof is only about 1 to 5 Wh/L, such devices, when used alone, do not lend themselves well to the above-mentioned energy storage systems.

Meanwhile, nickel hydrogen batteries, which are employed today in hybrid electric vehicles, have a high power density of over 2 kW/L and an energy density of about 160 Wh/L. Still, tremendous effort has been poured into research aimed at further enhancing the reliability of the battery by further increasing its energy density and also improving its stability at high temperatures.

In the field of lithium ion batteries, researches have proceeded into increasing power density. For example, lithium ion batteries with high power exceeding 3 kW/L at a DOD of 50% have been developed, but these batteries have no more than 100 Wh/L of energy density and are actually designed to suppress high energy density, which is the most characteristic feature of a lithium ion battery.

Thus, there is a strong demand for a battery that combines high power (at least 2 kW/L) and high energy density (180 Wh/L), but so far no battery that satisfies these technical requirements has been developed.

In order to achieve high energy density and high power density simultaneously in a lithium ion battery, it is necessary to adopt a multi-pronged approach to improve the characteristics of the various cell constituent materials, such as the negative electrode material, positive electrode material, electrolyte and so forth. At present, when negative electrode materials such as carbon materials and graphite-based materials are utilized in lithium ion battery production, the capacity decreases markedly during rapid discharge of, for example, about 5 minutes (current density of 4000 mA/g) as compared to a slower discharge of about 1 hour (current density of 300 mA/g). Therefore, a significant breakthrough is required in order to develop a lithium-based secondary battery that combines high energy density and high power density.

Furthermore, lithium-containing metal oxides used as positive electrode materials of lithium ion batteries (typified by $LiCoO_2$, $LiMn_2O_4$, $LiNiO_2$ and so forth) make the battery capacity drop markedly during a high-rate discharge of about 5 minutes as compared to a 1C discharge, similar to the graphite-based materials used for the negative electrode, so once again a significant breakthrough is needed to improve the performance of a lithium-based secondary battery.

Meanwhile, the activated carbon used in the capacitor, a high power device, generally has a specific surface area of at least 1000 $m^2$/g. Even if such capacitor-use activated carbon is doped with lithium ions, the efficiency thereof is extremely low, and the density of an electrode obtained therefrom is also low, thus making it difficult to use such activated carbon in a battery having high power and high capacity.

Therefore, a primary object of the present invention is to provide a lithium-based secondary battery that has high energy density and high power density.

DISCLOSURE OF THE INVENTION

As a result of research focusing on the above-mentioned problems encountered with the prior art, the inventors succeeded in attaining a nonaqueous lithium secondary battery that combines high energy density and high power density by using a specific positive electrode material and negative electrode material.

Specifically, the present invention provides the following nonaqueous lithium secondary battery:

1. A nonaqueous lithium secondary battery comprising a positive electrode, a negative electrode, and a nonaqueous electrolyte, wherein:

1) the positive electrode comprises a porous carbonaceous material whose specific surface area as measured by a BET method is at least 500 $m^2$/g, or a mixture of a porous carbonaceous material whose specific surface area as measured by a BET method is at least 500 $m^2$/g and a material capable of electrochemically occluding and releasing lithium, and 2) the negative electrode comprises a carbonaceous material whose specific surface area as measured by a BET method is 20 to 1000 $m^2$/g.

2. The nonaqueous lithium secondary battery according to item 1 above, wherein the positive electrode comprises a mixture of a porous carbonaceous material whose specific surface area as measured by a BET method is at least 500 $m^2$/g and a material capable of electrochemically occluding and releasing lithium, with the respective mixing ratio thereof being 100/0 to 30/70 (weight ratio).

3. The nonaqueous lithium secondary battery according to item 1 or 2 above, wherein the negative electrode has an initial coulomb efficiency of at least 30%, and a capacity of at least 300 mAh/g at a discharge rate of 4000 mA/g.

4. The nonaqueous lithium secondary battery according to any of item 1 to 3 above, wherein the negative electrode material is an amorphous material.

5. The nonaqueous lithium secondary battery according to any of item 1 to 4 above, wherein the negative electrode material is a material comprising activated carbon whose surface is covered with a carbonaceous material.

BEST MODE FOR CARRYING OUT THE INVENTION

Figure 1:
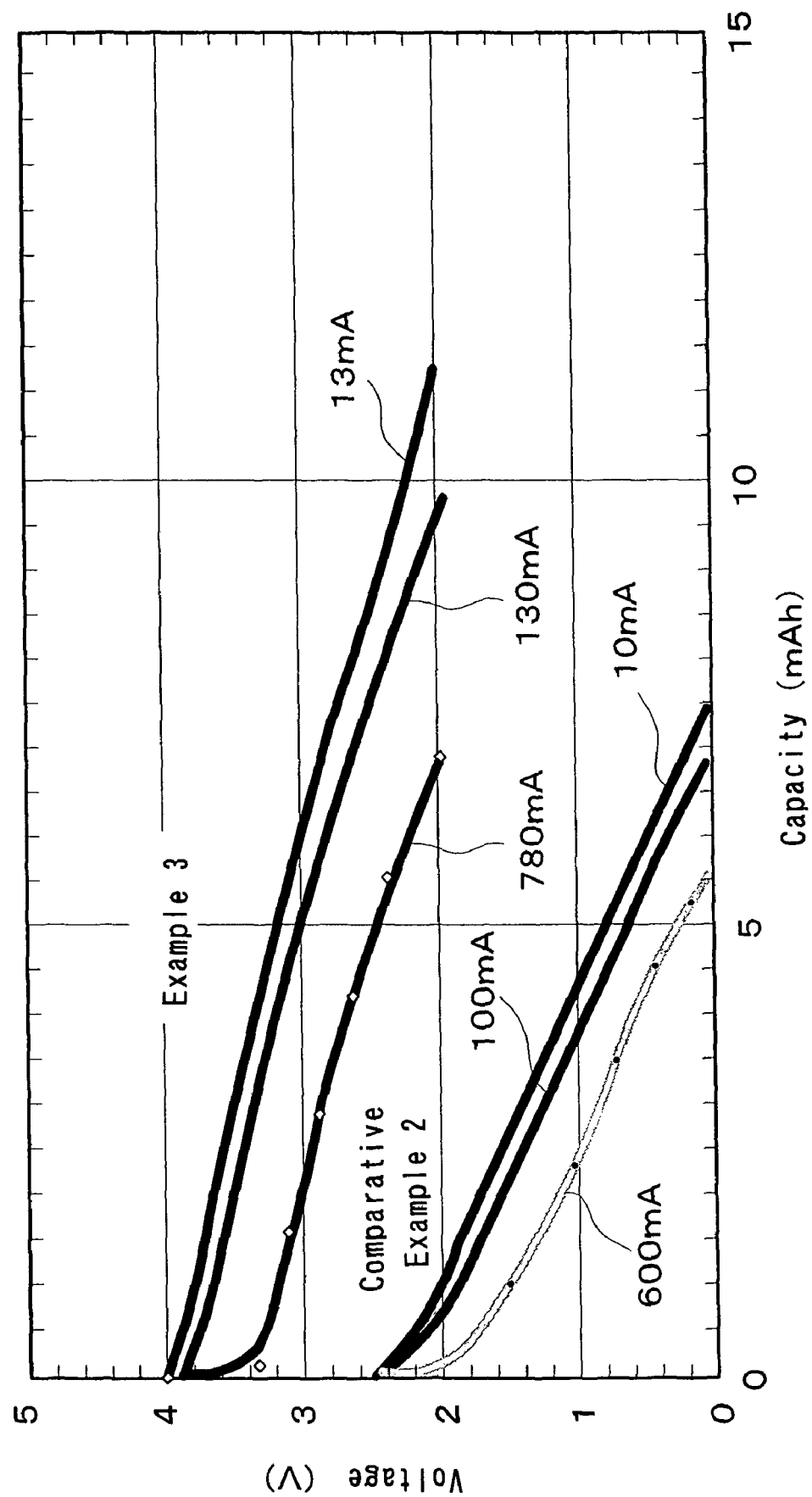
FIG. 1 is a graph showing the characteristics of the nonaqueous lithium secondary battery obtained by Example 3 of the present invention, and the characteristics of the nonaqueous lithium secondary battery obtained by Comparative Example 1.

Embodiments of the present invention will now be described in detail.

The positive electrode material in the lithium-based secondary battery of the present invention comprises a porous carbonaceous material whose specific surface area as measured by a BET method is at least 500 $m^2/g$, or a mixture of a porous carbonaceous material whose specific surface area as measured by BET is at least 500 $m^2/g$ and a material capable of electrochemically occluding and releasing lithium.

There are no restrictions on the porous carbonaceous material used as the positive electrode material, as long as its specific surface area as measured by a BET method (hereinafter referred to simply as "specific surface area" unless otherwise necessary) is at least 500 $m^2/g$. Examples of porous carbonaceous material include activated carbon and carbon black such as ketjen black and so forth. The specific surface area of the porous carbonaceous material must be at least 500 $m^2/g$, but at least 1000 $m^2/g$ is preferable, and at least 1500 $m^2/g$ more preferable. If the specific surface area of the porous carbonaceous material is too low, the doping amount of the anion species (discussed below) will be too small and satisfactory capacity will not be obtained during high-rate power discharge. From the standpoint of packing density, it is preferable for the specific surface area of the porous carbonaceous material used for the positive electrode to be no higher than 2500 $m^2/g$.

The positive electrode material can also be a combination of a porous carbonaceous material and a material capable of electrochemically occluding and releasing lithium (the additional material used here will hereinafter sometimes be referred to simply as the "co-material"). There are no restrictions on this co-material, as long as it is capable of electrochemically occluding and releasing lithium. Examples of a co-material include lithium-containing cobalt oxides, lithium-containing nickel oxides, lithium-containing manganese oxides, mixtures of these lithium-containing metal oxides, and lithium-containing oxides produced by adding to the above-mentioned lithium-containing metal oxides or lithium-containing metal oxide mixtures at least one other metallic element(s) (such as adding nickel, manganese, iron, vanadium, aluminum, magnesium and so forth to a cobalt-based oxide; adding cobalt, manganese, iron, vanadium, aluminum, magnesium and so forth to a nickel-based oxide; or adding cobalt, nickel, iron, vanadium, aluminum, magnesium and so forth to a manganese-based oxide). The amount of other metallic element(s) to be added can be appropriately selected according to the performance required for the co-material, the combination of metals making up the lithium-containing metal oxide, and other such factors. For instance, a ratio of Co:Ni=1:1 can be used with a lithium-containing Co—Ni metal oxide. It is also possible to use an oxide of a metal such as manganese, vanadium, iron or the like (which may also include other metallic element(s)), a disulfide compound, or the like. The phrase "co-material capable of electrochemically occluding and releasing lithium" as used in the present invention does not, of course, include the above-mentioned porous carbonaceous material whose specific surface area is at least 500 $m^2/g$.

In the positive electrode of the battery pertaining to the present invention, the porous carbonaceous material is doped with the anions contained in the electrolyte during the charging of the battery, and these anions are undoped during discharge. This doping/undoping reaction proceeds at an extremely high rate, fast enough, for example, to keep up with a high-power rate discharge exceeding 10C.

When the secondary battery of the present invention is required to have a high power for a relatively short time and to maintain its power for short periods (that is, when the battery does not need to have a very large capacity), the porous carbonaceous material can be used alone as the positive electrode. In contrast, when both high output and high capacity are required, the co-material can be used together with the porous carbonaceous material. The capacity of the co-material in the present invention varies with the specific gravity thereof, and it is preferable to use a material that can afford a specific capacity of at least 100 mAh/g.

Whether to use as a positive electrode material only a porous carbonaceous material with a specific surface area of at least 500 $m^2/g$, or whether to use as a positive electrode material a mixture of a porous carbonaceous material with a specific surface area of at least 500 $m^2/g$ and a material capable of electrochemically occluding and releasing lithium, and how to fix a mixing ratio when a mixture is used, and so forth are appropriately determined as dictated by the specifications of the targeted battery. For instance, when the battery is to be used in a hybrid electric vehicle or the like, a high power is required for relatively short periods and needs to be sustained for only about 10 seconds, so only a porous carbonaceous material can be used. For batteries that require high output and high power, it is desirable to use a mixture of a porous carbonaceous material with a specific surface area of at least 500 $m^2/g$ and a co-material. In any case, the capacity and power characteristics of the battery would be better than those of an electric double layer capacitor using activated carbon in the electrode.

When using a mixture of a porous carbonaceous material with a specific surface area of at least 500 $m^2/g$ and a co-material, it is preferable that the mixing ratio of the co-material should be no more than 70%, and more preferably no more than 50%, with respect to the combined weight of the two materials. Sufficient power cannot be attained if the mixing ratio of the co-material exceeds 70%.

The negative electrode in the present invention comprises a carbonaceous material whose specific surface area as measured by a BET method is 20 to 1000 $m^2/g$, preferably 50 to 800 $m^2/g$, and more preferably 100 to 600 $m^2/g$. If the specific surface area is too small, the power will not be sufficiently high. On the other hand, if the specific surface area is too large, the initial charging/discharging efficiency of the lithium ions will decrease markedly, and the density of the electrode using the negative electrode material will deteriorate, leading to a reduction in capacity per unit of volume. To raise the rate of lithium ion migrating from the negative electrode material to the electrolyte, the electrolyte must be able to adequately permeate the active material, and to this end it is preferable that a volume of pores, particularly those with a diameter of about 10 to 100 Å, be suitably controlled.

There are no particular restrictions on the negative electrode material of the lithium secondary battery pertaining to the present invention, as long as it has the above characteristics and structure. Taking into consideration the lithium ion migration within the active material, however, it is preferable to use an amorphous carbon material. An amorphous carbon material has a gently-sloping charging/discharging curve than a crystalline material, such as graphite, and is also preferable to a crystalline material in that lithium can be charged and discharged at a higher rate.

The capacity of the negative electrode material of the lithium secondary battery pertaining to the present invention is at least 400 mAh/g, and preferably at least 500 mAh/g. In prior art, the negative electrode active materials of lithium ion battery generally have a capacity of about 200 to 300 mAh/g. However, to obtain a high-power battery, it is preferable that the porosity of the negative electrode, which supports the electrolyte as discussed below (the sum of the porosity of the negative electrode material itself and the porosity attributable to the gaps between the negative electrode material particles in the formed negative electrode), be set to about 35 to 60%, and the energy density of the battery tends to decrease when the active material capacity is less than 400 mAh/g.

Examples of a favorable negative electrode material for a lithium-based secondary battery that satisfies the above requirements include amorphous carbon (such as a polyacenic-material, non-crystalline carbon and so forth). More specifically, it is preferable to use a carbonaceous material (a covered particle material) with a specific surface area of about 20 to 1000 m$^2$/g, obtained by forming a cover layer comprising an amorphous carbonaceous material (such as a polyacenic-material or non-crystalline carbon and so forth) on the surface of the carbon particles that serve as the nucleus (nuclear carbon particles).

For example, such a laminated particle material can be manufactured as follows. Nuclear carbon particles (such as activated carbon, charcoal, polyacenic-material, and so forth; hereinafter referred to collectively as "activated carbon") with an average particle size of about 1 to 500 μm (and preferably about 1 to 50 μm) and a specific surface area of at least 100 m$^2$/g (and preferably at least 600 m$^2$/g) are subjected to a heat treatment in the presence of a phenol resin, polyparaphenylene, polyphenylene sulfide, mesocarbon microbeads, pitch, pitch-based fibers, coke, or the like, which forms a cover layer on the surface of the particles; or the surface of activated carbon is coated ahead of time with a carbon precursor (a liquid organic substance, or a solid organic substance such as tar, pitch, a synthetic resin or the like that has been dissolved in an organic solvent) capable of forming a cover layer by heat treatment, after which a heat treatment is performed to form a cover layer; or activated carbon is heat treated in an inert atmosphere containing a gas of a hydrocarbon such as xylene, benzene or the like capable of forming a cover layer by heat treatment in the vapor phase. The above-mentioned material can be manufactured by the methods described above. There are no restrictions on the raw material of the activated carbon as long as the resulting laminated particle material exhibits the desired characteristics, and commercially available products obtained from a variety of raw materials, such as petroleum-based, coal-based, plant-based, polymer-based or the like, can be used. The heat treatment is preferably performed at a temperature of about 500 to 1500° C. in order to cover the surface of the activated carbon with an amorphous carbonaceous material, such as a non-crystalline carbon or a polyacenic-material. It is particularly favorable to cover the activated carbon surface with a polyacenic-material through a heat treatment at about 500 to 700° C. Specifically, a laminated particle material having a cover layer made from a polyacenic-material is favorable from the standpoint of safety, because, after lithium doping, the reaction of the material with the electrolyte at a temperature of about 150° C. generates less heat.

The amount of carbonaceous material covering the activated carbon is appropriately determined according to the structure and characteristics (such as the pore diameter and porosity) of the raw activated carbon, and is usually about 10 to 80% with respect to the activated carbon weight, although it is not limited to this.

The negative electrode material in the present invention has an initial coulomb efficiency of at least 30% (preferably at least 50%), and has a capacity of at least 300 mAh/g (preferably at least 320 mAh/g, and even more preferably at least 400 mAh/g) at a discharge rate of 4000 mA/g. This value can be measured, for example, with an electrode made from the negative electrode material for a lithium-based secondary battery of the present invention obtained by the method discussed above. Even if the carbonaceous material has a specific surface area (BET method) of 20 to 1000 m$^2$/g, a lithium-based secondary battery that combines the desired high energy density and high power cannot be obtained if the initial coulomb efficiency and/or capacity is outside the above range.

The negative electrode material in the present invention can be doped with lithium in advance. Pre-doping with lithium allows the initial coulomb efficiency, capacity, power characteristics, and so forth of the battery to be controlled. The pre-doping of the negative electrode material in the present invention is preferably performed electrochemically after the negative electrode material of the present invention has been formed into an electrode. Specific examples of a pre-doping method prior to battery assembly include a method in which an electrochemical system using metallic lithium as a counter electrode is set up, and in this state pre-doping is performed in a nonaqueous electrolyte (discussed below), a method in which a negative electrode impregnated with electrolyte is laminated with metallic lithium, and other methods. When pre-doping is performed after the battery has been assembled, the negative electrode can be clad with a lithium source (such as metallic lithium), after which an electrolyte is poured into the battery while the negative electrode and the lithium source are in electrical contact.

The method for forming positive electrode material and negative electrode material of the present invention into electrodes can be appropriately selected according to the shape, characteristics and so forth of the desired nonaqueous secondary battery from among known methods. For instance, an electrode can be obtained by mixing the positive electrode material (or negative electrode material) with a binder resin and, if needed, a conductive material, and then molding. There are no particular restrictions on the type of binder resin, and examples include polyvinylidene fluoride, polytetrafluoroethylene, and other such fluororesins; fluororubbers, SBR, acrylic resins, and polyethylene, polypropylene, and other such polyolefins.

There are no particular restrictions on the amount of the binder resin used for the positive electrode and negative electrode. The amount can be appropriately determined according to the type, particle size, and shape of the positive electrode material and negative electrode material of the present invention, the desired thickness and strength of the electrodes, and so forth. For instance, it is usually favorable to use the binder resin in a proportion of about 1 to 30% of the weight of the positive electrode material or negative electrode material of the present invention.

In the present invention, when the negative electrode is formed on a current collector, there are no particular restrictions on the matter and so forth of the collector. Copper foil, stainless steel foil, titanium foil, or the like can be used. It is also possible to use a base material as a collector that allows the electrode to be formed on a metal foil or in a gap between metals, such as expanded metal, mesh, or the like.

Examples of the electrolyte used in the battery of the present invention include any known nonaqueous electrolyte, such as a polymer gel electrolyte, polymer electrolyte, or nonaqueous electrolyte containing a lithium salt. The electrolyte can be appropriately determined according to the type of positive electrode material, the properties of the negative electrode material, and the charging voltage and other such usage conditions. To obtain a battery with high power, it is preferable for the electrolyte to have a conductivity of at least $1 \times 10^{-3}$ S/cm, with a conductivity of at least $3 \times 10^{-3}$ S/cm being preferable. Examples of nonaqueous electrolytes containing a lithium salt include those produced by dissolving $LiPF_6$, $LiBF_4$, $LiClO_4$, and the like such lithium salt in one or more types of organic solvent, such as propylene carbonate, ethylene carbonate, diethyl carbonate, dimethyl carbonate, methyl ethyl carbonate, dimethoxyethane, γ-butyl lactone, methyl acetate, and methyl formate. There are no particular restrictions on the concentration of the electrolytic solution, and about 0.5 to 2 mol/L is generally considered practical. Naturally, it is better for the water content of the electrolytic solution to be as low as possible, and 100 ppm or less is favorable. In this Specification, the term "nonaqueous electrolyte" refers not only to nonaqueous electrolytic solutions and organic electrolytic solutions, but also to electrolytic solutions containing a gel or solid electrolyte.

There are no particular restrictions on the shape, size, etc., of the nonaqueous secondary battery of the present invention. The battery can be cylindrical, rectangular, a flat-shaped, box-shaped, or have any other configuration as desired.

The present invention provides a nonaqueous lithium secondary battery that has high energy density and also high power.

EXAMPLES

The characteristic features of the present invention will now be described in further detail by giving examples.

Example 1

(1) 5 g of a commercially available pitch-based activated carbon (particle size: 10 μm; specific surface area: 2000 m²/g) was put in stainless steel mesh basket, which was placed on a ceramic dish containing 10 g of isotropic pitch (softening point: 270° C.), put in a small cylindrical furnace (furnace core inside diameter: 100 mm), and subjected to a heat treatment. This heat treatment was conducted under a nitrogen atmosphere, and the nitrogen flow rate was set at 0.5 L/min. The inside of the furnace was heated to 700° C., maintained at this temperature for 4 hours and naturally cooled down to 60° C., and then a carbonaceous material-covered activated carbon was picked up from the furnace.

The heat-treated and carbonaceous material-covered activated carbon thus obtained weighed 50% more than the raw material pitch-based activated carbon, and its specific surface area was measured by a BET method (measurement device: NOVA1200 made by Yuasa Ionics) and found to be 550 m²/g.

Next, 100 weight parts of the carbonaceous material-covered activated carbon obtained above was mixed with 10 weight parts acetylene black, 10 weight parts PVdF (polyvinylidene fluoride), and 200 weight parts NMP (N-methylpyrrolidone) to obtain a slurry. One side of a copper foil with a thickness of 14 μm was then coated with the slurry thus obtained, and this product was dried and pressed to obtain an electrode with a thickness of 50 μm. This electrode had a density of 1.01 g/cc.

An electrochemical cell was produced in an argon dry box using the electrode obtained above as a working electrode, using metallic lithium as a counter electrode and a reference electrode, and using a solution obtained by dissolving $LiPF_6$ in a concentration of 1 mol/L in a mixed solvent comprising ethylene carbonate and methyl ethyl carbonate in a 3:7 weight ratio as the electrolyte. Doping with lithium was performed at a rate of 100 mA/g with respect to the active material weight until the voltage reached 1 mV with respect to the lithium potential, and then a constant voltage of 1 mV with respect to the lithium potential was applied for 20 hours, which completed the doping. Next, undoping was performed up to 2 V with respect to the lithium potential at a rate of 100 mA/g with respect to the active material weight, whereupon a discharge capacity of 605 mAh/g and an initial coulomb efficiency of 56% were obtained.

The charge rate and discharge rate were then varied and the capacity measured. Specifically, a capacity of at least 400 mA/g was obtained in discharging at 4000 mA/g or in charging for 5 minutes (performed at a rate of 4000 mA/g with respect to the active material weight until the voltage reached 1 mV with respect to the lithium potential, a constant voltage of 1 mV with respect to the lithium potential was applied, and the total charging time was set at 5 minutes).

(2) 100 weight parts of a commercially available pitched-based activated carbon (particle size: 10 μm; specific surface area: 2000 m²/g), 5 weight parts ketjen black, 10 weight parts PVdF, and 250 weight parts NMP were mixed to obtain a slurry for positive electrode. This slurry was used to coat an aluminum foil with a thickness of 20 μm that would serve as a collector, and this product was dried and pressed to obtain a positive electrode with a thickness of 150 μm.

(3) A battery was assembled by stacking the negative electrode (50 mm ×30 mm) and positive electrode (50 mm ×30 mm) obtained in (1) and (2) above so that they faced each other with a separator being interposed between them (porous polyethylene made by Tonen Tapyrus; 52 mm ×32 mm). The negative electrode here had been electrochemically pre-doped with lithium at 1000 Ah/g with respect to the material weight, and the electrolytic solution was obtained by dissolving $LiPF_6$ in a concentration of 1 mol/L in a mixed solvent comprising ethylene carbonate and methyl ethyl carbonate in a 3:7 weight ratio.

(4) The battery produced above was charged up to 4.2 V at a current of 2 mA, after which a constant voltage of 4.2 V was applied, and this constant-current constant-voltage charging was continued for 8 hours. The battery was then discharged down to 2.5 V at a constant current of 2 mA. The discharge capacity was 6 mAh.

The battery was then charged back up to 4.2 V at a current of 2 mA, after which a constant voltage of 4.2 V was applied, and this constant-current constant-voltage charging was continued for 8 hours, after which the battery was discharged for 10 seconds at a current of 500 mA, then charged for 1 minute at 4.2 V (maximum current of 1000 mA), and this cycle was repeated 10 times, whereupon current could be taken off at a high rate of over 80C.

Example 2

(1). 50 weight parts $LiCoO_2$ (C-012 made by Seimi Chemical), 50 weight parts of a commercially available pitch-based activated carbon (particle size: 10 μm; specific surface area: 2000 $m^2/g$), 8 weight parts PVdF, and 200 weight parts NMP were mixed to obtain a slurry for positive electrode. This slurry was used to coat an aluminum foil with a thickness of 20 μm that would serve as a collector, and this product was dried and pressed to obtain a positive electrode with a thickness of 150 μm.

(2) A battery was assembled by stacking the positive electrode (50 mm ×30 mm) obtained in (1) above and a negative electrode the same as in Example 1 (50 mm ×30 mm) so that they faced each other with a separator being interposed between them (porous polyethylene made by Tonen Tapyrus; 52 mm ×32 mm). The negative electrode here had been electrochemically pre-doped with lithium at 500 mAh/g with respect to the material weight, and the electrolytic solution was obtained by dissolving $LiPF_6$ in a concentration of 1 mol/L in a mixed solvent comprising ethylene carbonate and methyl ethyl carbonate in a 3:7 weight ratio.

(3) The battery produced above was charged up to 4.2 V at a current of 5 mA, after which a constant voltage of 4.2 V was applied, and this constant-current constant-voltage charging was continued for 8 hours. The battery was then discharged down to 2.5 V at a constant current of 5 mA. The discharge capacity was 25 mAh.

The battery was then charged back up to 4.2 V at a current of 5 mA, after which a constant voltage of 4.2 V was applied, and this constant-current constant-voltage charging was continued for 8 hours, after which the battery was discharged for 10 seconds at a current of 750 mA, then charged for 1 minute at 4.2 V (maximum current of 750 mA), and this cycle was repeated 10 times, whereupon current could be taken off at a high rate of over 30C.

Comparative Example 1

(1) 100 weight parts of a commercially available pitch-based activated carbon (particle size: 10 μm; specific surface area: 2000 $m^2/g$), 5 weight parts ketjen black, 10 weight parts PVdF, and 250 weight parts NMP were mixed to obtain a slurry for electrode. This slurry was used to coat an aluminum foil with a thickness of 20 μm that would serve as a collector, and this product was dried and pressed to obtain a electrode with a thickness of 100 μm (used as the positive electrode and negative electrode in (2) below).

(2) An electric double layer capacitor was assembled by using the electrodes produced in (1) (50 mm ×30 mm) as the positive and negative electrodes and stacking these electrodes so that they faced each other with a separator being interposed between them (electrolytic capacitor paper; 52 mm ×32 mm). The electrolytic solution was obtained by dissolving triethylmethylammonium tetrafluoroborate in a concentration of 1.5 mol/L in propylene carbonate. The battery thus produced was charged up to 2.5 V at a current of 2.5 mA, after which a constant voltage of 2.5 V was applied, and this constant-current constant-voltage charging was continued for 8 hours. The battery was then discharged down to 1 V at a constant current of 1 mA. The discharge capacity was 2.7 mAh.

The battery was then charged back up to 2.5 V at a current of 2 mA, after which a constant voltage of 2.5 V was applied, and this constant-current constant-voltage charging was continued for 8 hours, after which the battery was discharged at a current of 500 mA, whereupon the capacitor voltage dropped below 1 V within 10 seconds.

Example 3

(1) 50 g of a commercially available pitch-based activated carbon (particle size: 10 μm; specific surface area: 2000 $m^2/g$) was put in stainless steel mesh basket (300 mm×200 mm; depth: 50 mm), which was placed in a stainless steel vat containing 100 g of isotropic pitch (softening point: 270° C.). The vat was covered (leaving a small gap because the basket was made of stainless steel mesh), and put in a rectangular electric furnace (furnace internal dimensions: 400 mm×400 mm×400 mm), and subjected to a heat treatment. This heat treatment was conducted under a nitrogen atmosphere, and the nitrogen flow rate was set at 5 L/min. The inside of the furnace was heated to 700° C., maintained at this temperature for 4 hours and naturally cooled down to 60° C., and then a carbonaceous material-covered activated carbon was picked up from the furnace.

The heat-treated and carbonaceous material-covered activated carbon thus obtained weighed 29% more than the raw material pitch-based activated carbon, and its specific surface area was measured by a BET method (measurement device: NOVA 1200 made by Yuasa Ionics) and found to be 830 $m^2/g$.

Next, 100 weight parts of the carbonaceous material-covered activated carbon obtained above was mixed with 10 weight parts acetylene black, 10 weight parts PVdF (polyvinylidene fluoride) and 200 weight parts NMP (N-methylpyrrolidone) to obtain a slurry. Both sides of a copper foil with a thickness of 14 μm was then coated with the slurry thus obtained, and this product was dried and pressed to obtain an electrode A with a thickness of 154 μm. Also, one side of a copper foil with a thickness of 14 μm was coated, and this product was dried and pressed to obtain an electrode B with a thickness of 84 μm. The electrodes thus obtained both had a density of 0.85 g/cc.

An electrochemical cell was produced in an argon dry box using the one-sided electrode B obtained above as a working electrode, using metallic lithium as a counter electrode and a reference electrode, and using a solution obtained by dissolving $LiPF_6$ in a concentration of 1 mol/L in a mixed solvent comprising ethylene carbonate and diethyl carbonate in a 3:7 weight ratio as the electrolyte. Doping with lithium was performed at a rate of 100 mA/g with respect to the active material weight until the voltage reached 1 mV with respect to the lithium potential, and then a constant voltage of 1 mV with respect to the lithium potential was applied for 20 hours, which completed the doping. Next, undoping was performed up to 2 V with respect to the lithium potential at a rate of 100 mA/g with respect to the active material weight, whereupon a discharge capacity of 560 mAh/g and an initial coulomb efficiency of 51% were obtained.

The discharge rate was then varied and the capacity measured. A capacity of 320 mA/g was obtained in discharging at 4000 mA/g.

(2) 100 weight parts of a commercially available pitched-based activated carbon (particle size: 10 μm; specific surface area: 2000 $m^2/g$), 5 weight parts ketjen black, 10 weight parts PVdF, and 250 weight parts NMP were mixed to obtain a positive electrode mix slurry. This slurry was used to coat both sides of an aluminum foil with a thickness of 20 μm that would serve as a collector, and this product was dried and pressed to obtain a positive electrode with a thickness of 320 µm. The electrode thus obtained had a density of 0.62 g/cc. B4,AMD (3) The negative electrodes (two of the one-sided negative electrodes B and three of the two-sided negative electrodes A; 15 mm ×21 mm) and positive electrodes (four of the two-sided positive electrodes; 14 mm ×20 mm) obtained in (1) and (2) above and separators (porous polyethylene; 16 mm ×22 mm) were stacked in the order of one-sided negative electrode B/separator/two-sided positive electrode/ separator/two-sided negative electrode A/separator/two-sided positive electrode/ separator/two-sided negative electrode A/separator/two-sided positive electrode/separator/two-sided negative electrode A/separator/two-sided positive electrode/ separator/one-sided negative electrode B. The positive and negative electrode terminals were welded and inserted into a resin-aluminum laminated film pouch, after which electrolyte was poured in and the resinous opening was heat-fused and sealed shut. Metallic lithium with a thickness of 20 µm was press-bonded to the surface of all the negative electrodes before the stacking. The electrolytic solution was obtained by dissolving $LiPF_6$ in a concentration of 1 mol/L in a mixed solvent comprising ethylene carbonate and diethyl carbonate in a 3:7 weight ratio. The battery thus produced was allowed to stand for 1 day before measurements were started.

(4) The battery produced above was charged up to 4.0 V at a current of 2 mA, after which a constant voltage of 4.0 V was applied, and this constant-current constant-voltage charging was continued for 8 hours. The battery was then discharged down to 2.0 V at a constant current of 13 mA. The discharge capacity was 11.3 mAh.

The battery was then charged back up to 4.0 V at a current of 2 mA, after which a constant voltage of 4.0 V was applied, and this constant-current constant-voltage charging was continued for 8 hours, after which the battery was discharged down to 2.0 V at a constant current of 130 mA. The discharge capacity was 9.8 mAh. Charging was performed once again in the same manner, after which the battery was discharged down to 2.0 V at a constant current of 780 mA. The discharge capacity was 7 mAh.

FIG. 1 is a graph of the discharge curves under various conditions for the batteries obtained in Example 3 and Comparative Example 2 (below).

Comparative Example 2

(1) 100 weight parts of a commercially available pitch-based activated carbon (particle size: 10 µm; specific surface area: 2000 m$^2$/g), 5 weight parts ketjen black, 10 weight parts PVdF, and 250 weight parts NMP were mixed to obtain a slurry for electrode. This slurry was used to coat both sides of an aluminum foil with a thickness of 20 µm that would serve as a current collector, and this product was dried and pressed to obtain an electrode C with a thickness of 320 µm (used as the positive electrode and negative electrode in (2) below). Also, one side of an aluminum foil with a thickness of 20 µm was coated, and this product was dried and pressed to obtain an electrode D with a thickness of 170 µm (used as the positive electrode and negative electrode in (2) below). The electrodes thus obtained both had a density of 0.62 g/cc.

(2) The electrodes produced in (1) (two of the negative electrode-use one-sided electrodes D, two of the negative electrode-use two-sided electrodes C, and three of the positive electrode-use two-sided electrodes C; 14 mm ×20 mm) and separators (electrolytic capacitor paper; 16 mm ×22 mm) were stacked in the order of one-sided electrode D (negative electrode)/separator/two-sided electrode C (positive electrode)/separator/two-sided electrode C (negative electrode)/separator/two-sided electrode C (positive electrode)/separator/two-sided electrode C (negative electrode)/separator/two-sided electrode C (positive electrode)/separator/one-sided electrode D (negative electrode). The positive and negative electrode terminals were welded and inserted into a resin-aluminum laminate film pouch, after which electrolyte was poured in and the resinous opening was heat-fused and sealed shut. The electrolytic solution was obtained by dissolving triethylmethylammonium tetrafluoroborate in a concentration of 1.5 mol/L in a solvent (propylene carbonate). The thickness of the electric double layer capacitor thus obtained was the same as in Example 3.

(4) The battery thus produced was charged up to 2.5 V at a current of 2 mA, after which a constant voltage of 2.5 V was applied, and this constant-current constant-voltage charging was continued for 8 hours. The battery was then discharged down to 0 V at a constant current of 10 mA. The discharge capacity was 7.5 mAh.

The battery was then charged up to 2.5 V at a current of 2 mA, after which a constant voltage of 2.5 V was applied, and this constant-current constant-voltage charging was continued for 8 hours, after which the battery was discharged down to 0 V at a constant current of 100 mA. The discharge capacity was 6.8 mAh. Charging was performed once again in the same manner, after which the battery was discharged down to 0 V at a constant current of 600mA. The discharge capacity was 5.5 mAh.

INDUSTRIAL APPLICABILITY

As is clear from the results shown in FIG. 1, the nonaqueous secondary batteries pertaining to the present invention, in which a porous carbonaceous material was used for the negative electrode, had higher voltage and higher capacity than the conventional electric double layer capacitors, and their output characteristics were also superior.

The invention claimed is:

1. A nonaqueous lithium secondary battery comprising a positive electrode, a negative electrode, and a nonaqueous electrolyte, wherein:
   1) the positive electrode comprises a porous carbonaceous material whose BET specific surface area is at least 500 m$^2$/g, or a mixture of a porous carbonaceous material whose BET specific surface area is at least 500 m$^2$/g and a material capable of electrochemically occluding and releasing lithium; and
   2) the negative electrode comprises a carbonaceous material whose BET specific surface area is 50 to 1000 m$^2$/g, the carbonaceous material comprising a cover layer on the surface of a nuclear carbon particle, the cover layer comprising an amorphous carbonaceous material, the nuclear carbon particle comprising activated carbon having a pore structure and with a BET specific surface area of at least 100 m$^2$/g, an amount of the amorphous carbonaceous material being 10 to 80% with respect to the activated carbon weight, the carbonaceous material being obtained by subjecting the nuclear carbon particle to a heat treatment in an inert atmosphere containing a hydrocarbon gas capable of forming a cover layer by heat treatment in a vapor phase.

2. The nonaqueous lithium secondary battery according to claim 1, wherein the mixture of the porous carbonaceous material and the material capable of electrochemically occluding and releasing lithium is mixed at a mixing ratio of 100/0 to 30/70(weight ratio).

3. The nonaqueous lithium secondary battery according to claim 1, wherein the negative electrode has an initial coulomb efficiency of at least 30%, and a capacity of at least 300 mAh/g at a discharge rate of 4000 mA/g, wherein the initial coulomb efficiency is obtained under the conditions that doping with lithium was performed at a rate of 100 mA/g with respect to an active material weight until voltage reached 1 mV with respect to a lithium potential, and then a constant voltage of 1 mV with respect to the lithium potential was applied for 20 hours, which completed the doping, and then undoping is performed up to 2 V with respect to the lithium potential at a rate of 100 mA/g with respect to the active material weight.

4. The nonaqueous lithium secondary battery according to claim 1, wherein the mixture of the porous carbonaceous material and the material capable of electrochemically occluding and releasing lithium is mixed at a mixing ratio of 100/0 to 30/70(weight ratio), and the negative electrode has an initial coulomb efficiency of at least 30%, and a capacity of at least 300 mAh/g at a discharge rate of 4000 mA/g, wherein the initial efficiency is obtained under the conditions that doping with lithium was performed at a rate of 100 mA/g with respect to an active material weight until voltage reached 1 mV with respect to a lithium potential, and then a constant voltage of 1 mV with respect to the lithium potential was applied for 20 hours, which completed the doping, and then undoping is performed up to 2 V with respect to the lithium potential at a rate of 100 mA/g with respect to the active material weight.

5. The nonaqueous lithium secondary battery according to claim 1, wherein the carbonaceous material of the negative electrode has a BET specific surface area of between 50 and 800 $m^2/g$.

6. The nonaqueous lithium secondary battery according to claim 1, wherein the carbonaceous material of the negative electrode has a BET specific surface area of between 100 and 600 $m^2/g$.

7. The nonaqueous lithium secondary battery according to claim 1, wherein the mixture of the porous carbonaceous material and the material capable of electrochemically occluding and releasing lithium is mixed at a mixing ratio of 100/0 to 50/50(weight ratio).

8. The nonaqueous lithium secondary battery according to claim 1, wherein the nuclear carbon particle comprises activated carbon with a BET specific surface area of at least 600 $m^2/g$.

9. The nonaqueous lithium secondary battery according to claim 1, wherein the cover layer comprises a polyacenic material.

10. The nonaqueous lithium secondary battery according to claim 1, wherein the cover layer comprises non-crystalline carbon.

* * * * *